Jan. 10, 1956     S. H. EDGE ET AL     2,730,075
CONTROL MEANS FOR POWER-ASSISTED STEERING MECHANISM
Filed July 18, 1952     3 Sheets-Sheet 1
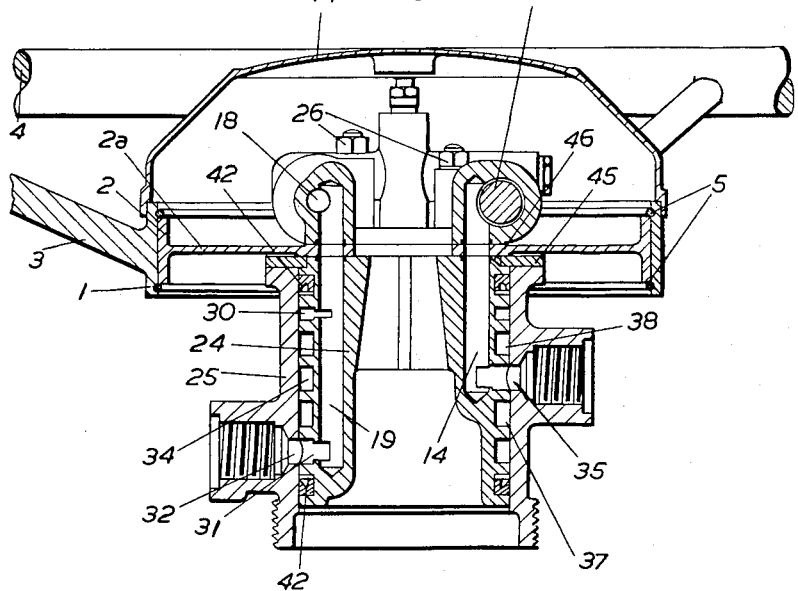
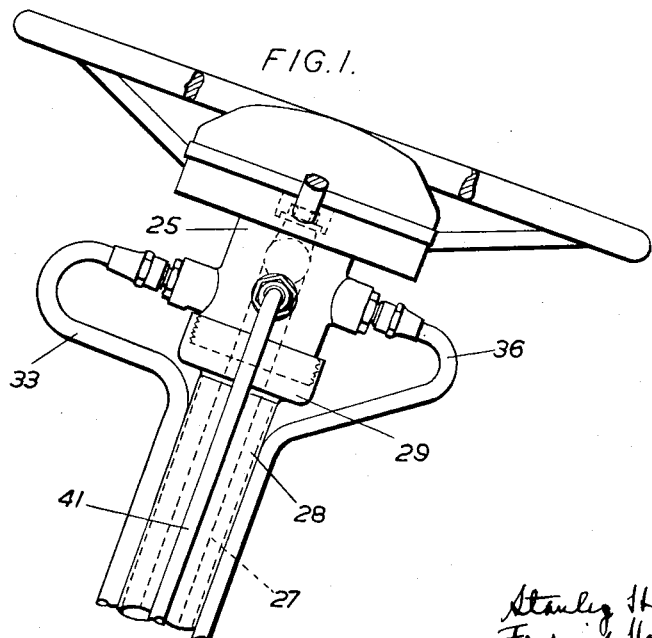
INVENTORS
Stanley Howard Edge
Frederick Henry Heacock
Douglas Leonard Jeffrey Young
By Rossie L. Bateman
Attorneys

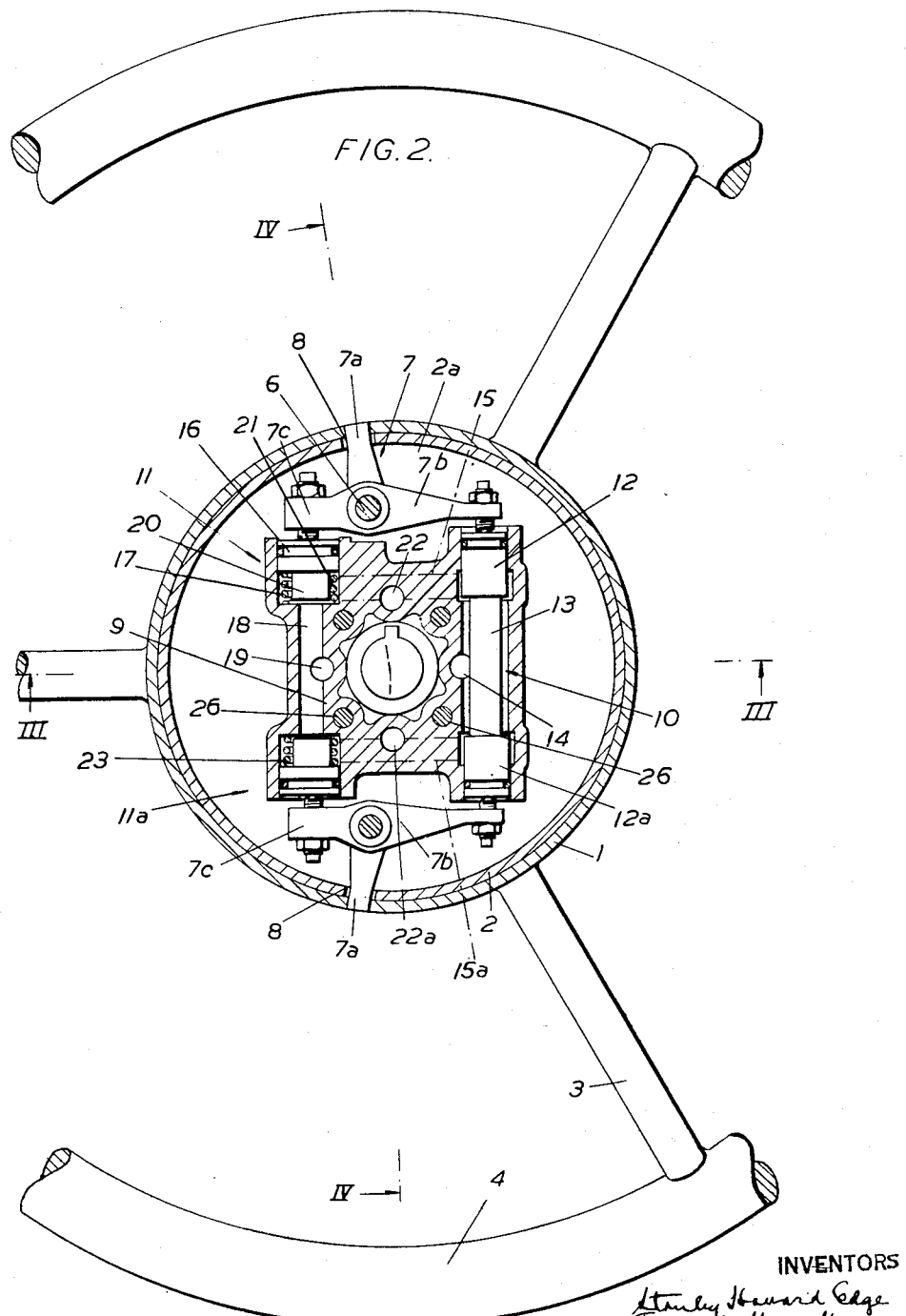

United States Patent Office 2,730,075
Patented Jan. 10, 1956

2,730,075

CONTROL MEANS FOR POWER-ASSISTED STEERING MECHANISM

Stanley Howard Edge, Danesgate, Lincoln, and Frederick Henry Heacock and Douglas Leonard Geoffrey Young, Lincoln, England, assignors to Clayton Dewandre Company Limited, Lincoln, England, a British company Application July 18, 1952, Serial No. 299,711

4 Claims. (Cl. 121—41)

This invention relates to control means for power-assisted steering mechanism for motor vehicles and has for its object to provide a novel or improved form of control mechanism adapted to be embodied in the steering assembly without any alteration in the steering box and steering column design thus enabling a manufacturer to use the same assembly for power-assisted and unassisted lay-outs whilst also enabling power assistance to be added to existing vehicles with the minimum of modification and expense.

It is also an object of the invention to provide improved control means for the purpose mentioned which will ensure at all times a degree of power assistance proportional to the turning moment applied to the steering wheel within the limits of the power source.

According to the invention the steering wheel is supported so as to have limited angular movement relative to the steering column shaft, a directional and pressure control valve mechanism for the power system being mounted fast with said shaft and means operatively connected with the steering wheel being provided for actuating said valve mechanism in accordance with the degree and direction of displacement of the steering wheel relative to the steering column shaft.

Preferably, the control valve mechanism is combined with a distributor which permits the necessary flow of pressure fluid between said valve mechanism and non-movable pipe lines, the valve mechanism and distributor forming a unit which is adapted to be supported on the upper end of the steering column.

Reference will now be made to the accompanying drawings which illustrate a preferred embodiment of the invention and wherein:

Fig. 1 shows the control mechanism in outside elevation,

Fig. 2 is a sectional plan view to a larger scale,

Fig. 3 is a cross section on the line III—III of Fig. 2, and

Figure 4:
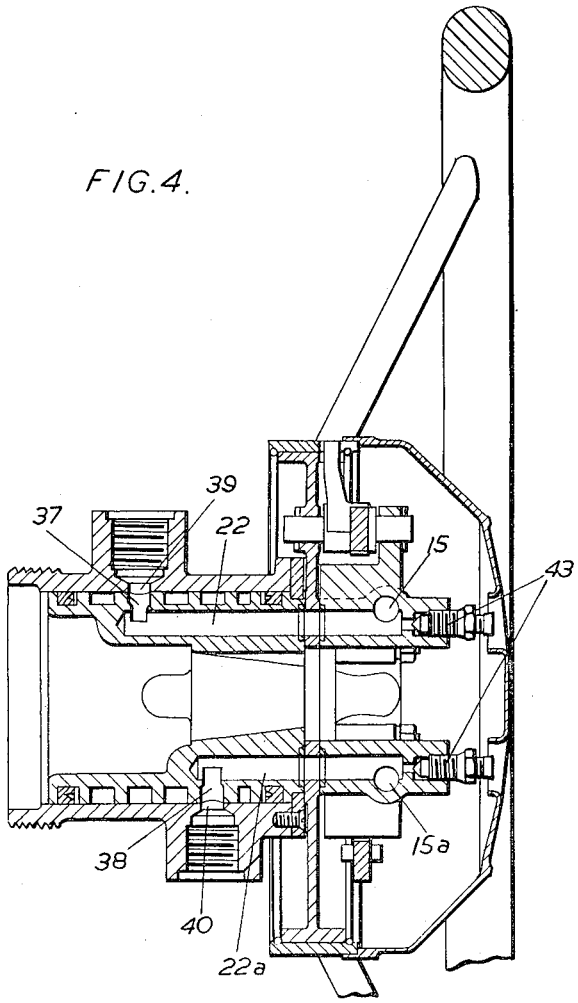
Fig. 4 is a cross section on the line IV—IV of Fig. 2.
Figure 5:
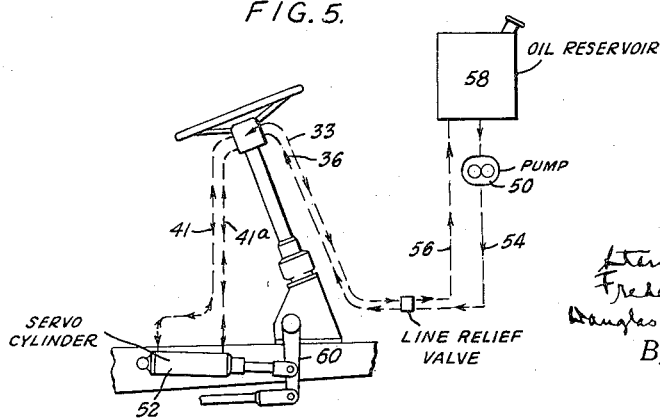
Fig. 5 is a diagrammatic view showing the fluid connections between the parts of the mechanism.

In the construction shown the steering wheel assembly comprises two relatively short concentric hub members 1, 2 having close fit one within the other but capable of relative angular movement, the outer hub 1 being attached by the usual arms 3 to the steering rim 4 whilst the inner hub 2 is rigidly attached to the steering column shaft in a manner hereafter described. The inner hub forms a bearing for the outer hub, axial displacement of the outer hub being prevented by the used of spring rings 5 as shown or by flanges or other abutments on either member, said inner hub 2 including a horizontal web portion 2a upon which is mounted the valve and valve actuating mechanism. The web 2a supports at almost diametrically opposed points a pair of pivot pins 6 upon each of which is mounted a three-armed valve actuating lever 7, one arm 7a of each lever extending at its outer end with clearance through a slot 8 in the inner hub 2 and being circumferentially located in a slot in the outer hub 1. Thus the length of the slots 8 in excess of the width of the arms 7a riding therein determines the maximum permitted angular movement of the steering wheel relative to the steering column shaft.

The mechanism shown is intended for use with a power system of the continuous flow hydraulic circuit type, i. e. comprising a fluid pump 50, a single-acting power cylinder for each direction of steering or one double-acting power cylinder 52 and appropriate flow and return lines 54, 56 connected to an oil reservoir 58, and to control such system there is provided a valve mechanism comprising a single housing 9 embodying at one side a transversely disposed directional control valve 10 and at the opposite side two aligned pressure control valves 11, 11a. The piston of the power cylinder 52 is attached to the usual steering arm 60 connected to the lower end of the steering column shaft. The directional control valve 10 is of the balanced piston type consisting of two opposed pistons 12, 12a rigidly interconected by a rod 13 and controlling respectively fluid flow between a pressure fluid supply passage 14 and two fluid feed passages 15, 15a the arrangement being such that axial displacement of the piston assembly from the mid-position shown in Fig. 2 will shut off flow to one or other of the two passages 15, 15a. It will be understood, however, that any other suitable type of directional control valve may be used. Each pressure control valve consists of a piston 16, movable within a chamber 17 which communicates at one side with the fluid feed passage 15 (15a), and at its inner end with a conduit 18 leading to a relief or return flow passage 19, said piston having an extension 20 of smaller diameter co-operating with the entrance to conduit 18 such that as the piston is depressed against the action of a loading spring 21 said extension gradually shuts off communication between the associated fluid feed passage and the relief passage. The pressure fluid supply passage 14 and the relief passage 19 are connected respectively to the pressure and suction sides of the pump whilst the two fluid lines 41, 41a from the power cylinder 52 or cylinders communicate by way of passages 22, 22a with the two fluid feed passages 15, 15a respectively. The other two arms 7b, 7c of each valve-actuating lever 7 bear respectively upon one end of the directional control valve 10 and upon the piston of one of the pressure control valves 11, 11a and the mechanism operates as follows:

With no turning moment on the steering wheel, the lever arms 7a are centrally disposed in the slots 8 in the inner hub member 2 and all valves are open. Thus oil circulates from the pressure passage 14 past both ends of the directional control valve 10, past both pressure control valves 11, 11a and through the relief passage 19 back to the pump. When, however, a turning moment is applied to the steering wheel, the outer hub member 1 moves relative to the inner hub member 2 and rocks the valve actuating levers 7. These movements of the levers displace the directional control valve 10 axially to shut off oil supply to one or other of the pressure control valves 11, 11a whilst simultaneously the other pressure control valve is urged towards its closed position. Thereby pressure is built up in the feed passage leading to this valve and in the power cylinder connected thereto, and as such pressure also acts upon the annular area 23 of the piston 16 surrounding the extension 20 it reacts through the valve actuating lever 7 upon the steering wheel so that the power generated to assist the steering is directly proportional to the turning moment on the steering wheel. Should the force applied to the steering wheel completely shut the pressure control valve, maximum power will be generated and all force in excess of that balanced by fluid pressure will be transmitted by contact between the piston and the housing. The relative angular movement between the steering wheel and the steering column shaft is therefore normally limited by the permitted travel of the appropriate pressure control valve piston in its chamber with the limited travel of the lever arms 7a in the slots 8 of the inner hub acting as emergency stops.

As the valve mechanism rotates with the steering column shaft, a distributor is used to provide connections with non-movable fluid lines. In the preferred form which is shown in the drawings, the distributor comprises an inner cylindrical body 24 having a close fit within a fixed cylindrical outer casing 25, said distributor body 24 together with the valve mechanism being secured to the web portion 2a of the inner hub 2 by bolts 26 and being adapted to be mounted fast upon the upper end of the steering column shaft 27 (Fig. 1) either directly or by a coupling or adapter, whilst the distributor casing 25 is attached to the upper end of the steering column casing 28 by an adapter 29 or equivalent means. The distributor body 24 is formed externally with a series of five peripheral grooves which communicate with fluid flow passages in the valve housing 9 and are aligned respectively with a series of ports in the distributor casing to which are connected the external fluid lines. Thus, as shown, the uppermost and lowermost grooves 30, 31 open into the relief or return passage 19, the groove 31 being aligned with a port 32 in the casing 25 to which is connected a fluid line 33 leading to the suction side of the pump. The groove 34 opens into passage 14 and communicates in like manner by way of port 35 and fluid line 36 with the pressure side of the pump. The other two grooves 37, 38 open respectively into passages 22, 22a and are aligned with ports 39, 40 to which are connected respectively the fluid lines 41 and 41a leading to the power cylinder or cylinders. The connection of the two end grooves 30, 31 to the return flow line prevents the sealing means 42 arranged at opposite ends of the distributor body being subjected to high pressure. Bleed screws 43 are arranged at the upper ends of passages 22, 22a and the valve and valve actuating mechanism is normally enclosed by a hub cap 44. Should the mounting of the distributor body 24 and/or the distributor casing 25 on their supporting means be such as to permit relative axial displacement of these members, the said distributor body and casing may have interengaging means, e. g. a locating ring 45 fast with the casing and engaging a complementary annular recess 46 in the body, to prevent axial movement between these members.

Thus it will be seen that the invention provides a simple and compact form of control mechanism capable of being embodied in any existing steering layout and which mechanism, being remotely situated from the power cylinder or cylinders, permits any degree of power assistance to be employed and to be applied at the most desirable and/or convenient point.

We claim:

1. Control means for power-assisted steering mechanism for motor vehicles, comprising a steering column shaft, an inner hub member having means for securing it to said shaft, a steering wheel connected to but having limited angular movement relative to said shaft, an outer hub member fixed to said steering wheel, the inner hub member providing bearing and supporting means for the outer hub member, a directional control valve supported on said inner hub member and operative to control the direction of operation of a fluid pressure power steering motor, a pair of fluid pressure control valves supported on said inner hub member and operative to supply pressure fluid to the power steering motor, said pressure control valves each having an area exposed to the motor pressure fluid, and multi-armed valve actuating levers each of which operatively engages a fluid pressure control valve and the directional control valve, said actuating levers being supported on the inner hub member and having rigid connection with the outer hub member and being operative in response to limited angular movement of the steering wheel in one or the other direction relatively to the steering column shaft for actuating said directional and pressure control valves in accordance with the degree and direction of angular movement of the steering wheel and for transmitting to the steering wheel reaction of the fluid on said areas of the pressure control valves.

2. Control means as defined in claim 1, including relatively stationary pipe lines communicating respectively with the pressure fluid supply and return of a fluid pressure source and with the power steering motor, and feed passages for the flow of pressure fluid between said control valves and said pipe lines, and a unit having means for supporting it on the upper end of the steering column and containing said control valves and having a distributor therein providing communication between said pipe lines and passages.

3. Control means as defined in claim 2, including a steering column casing for the steering column shaft, and wherein said control valves comprise a valve housing and said distributor comprises an inner body member bolted to said valve housing and has means for mounting it upon the upper end of the steering column shaft, and an outer casing having a close fit upon the inner body member and carried upon the upper end of the steering column casing, said inner body member being provided with a series of peripheral grooves communicating respectively with a pressure fluid supply passage, fluid return passage and the feed passages formed in said unit, and the outer casing being provided with spaced ports which are alined with the grooves which communicate respectively with the fluid supply and return passages and communicate respectively with said pipe lines which communicate with the pressure supply and return sides of the pressure source, and said inner body member being provided with peripheral grooves which communicate with said pipe lines communicating with the power steering motor.

4. Control means for power-assisted steering mechanism for motor vehicles adapted for use with a power system of the continuous flow hydraulic type, comprising a steering column shaft provided with an inner hub member having means for securing it to said shaft, a steering wheel having an outer hub member fixed thereto, the inner hub member providing bearing and supporting means for the outer hub member, the inner and outer hub members being provided with circumferential slots, a fluid pressure power steering motor, a directional control valve mounted on the steering column shaft for controlling the direction of operation of the fluid pressure power steering motor, a fluid pressure control valve mounted on the steering column shaft for controlling the supply of fluid pressure to the fluid pressure power steering motor, a pair of valve actuating levers mounted pivotally on the inner hub member and each having an arm which passes with clearance through a slot in the inner hub member and is located in a slot in the outer hub member, the valve actuating levers being operative in response to limited angular movement of the steering wheel in one or the other direction relatively to the steering column shaft to actuate said directional and pressure control valves, one of said slots having a sufficient circumferential length to permit normal rocking of the respective lever in response to limited angular movement of the steering wheel in one or the other direction to effect actuation of the respective valve but providing in cooperation with the respective actuating lever arm stop means for determining the maximum angular movement of the steering wheel relatively to the steering column shaft, pressure fluid supply and return passages and two fluid feed passages communicating respectively with the power steering motor, the directional control valve controlling fluid flow between the pressure fluid supply passage and the feed passages, and the fluid pressure control valve regulating fluid flow between the feed passages and the return passage, the fluid pressure control valve comprising a spring-loaded piston-like valve element depressible by one of the valve actuating levers to restrict or cut off fluid flow to the return flow passage and thereby produce a build up of pressure in the respective feed passage, and said piston-like valve element having an extension of reduced diameter defining an annular surface which is subject to fluid pressure developed in the respective feed passage the reaction of which is transmitted through the respective valve actuating lever to the steering wheel in proportion to the power assistance generated.

References Cited in the file of this patent

UNITED STATES PATENTS

| | | |
|---|---|---|
| 2,432,502 | Bentley et al. | Dec. 16, 1947 |
| 2,440,948 | Hawkins et al. | May 4, 1948 |
| 2,554,843 | Staude | May 29, 1951 |